Sept. 18, 1945.   J. L. PINKERTON   2,385,161
STEAM BOILER CONTROL
Filed Dec. 10, 1940

Jack L. Pinkerton.
INVENTOR

BY Victor J. Evans & Co.
ATTORNEYS

WITNESS

Patented Sept. 18, 1945

2,385,161

UNITED STATES PATENT OFFICE 2,385,161

STEAM BOILER CONTROL

Jack L. Pinkerton, Long Beach, Calif.

Application December 10, 1940, Serial No. 369,473

2 Claims. (Cl. 122—451)

My invention relates to the regulation of water levels in steam boilers and the like, and includes among its objects and advantages the provision of an improved controller designed to maintain predetermined levels in the boiler, to signal when the water level reaches a predetermined second low level, and to cut off the delivery of fuel to the boiler in the event that the water level drops to a dangerous or predetermined third low level.

Figure 1:
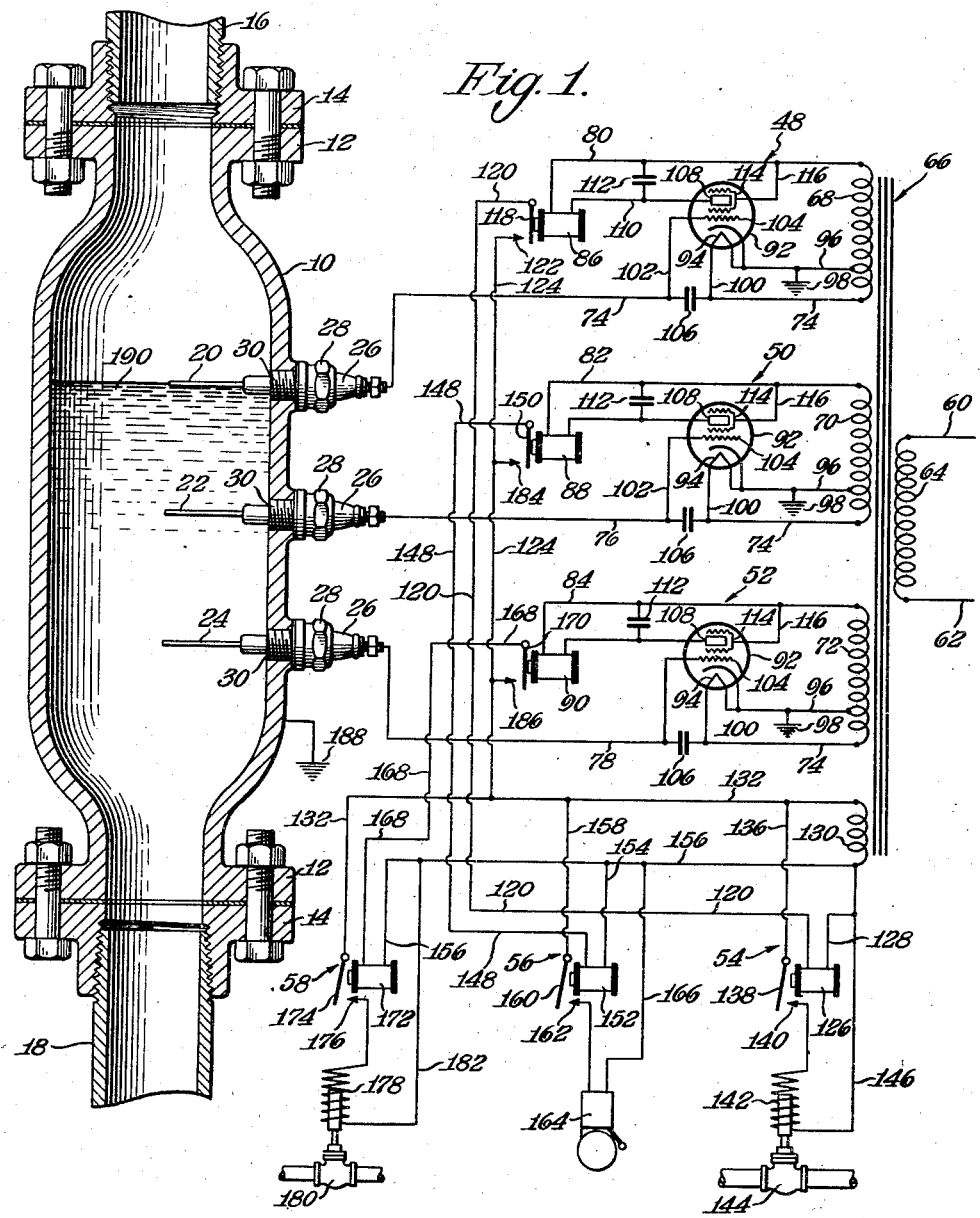
Figure 2:
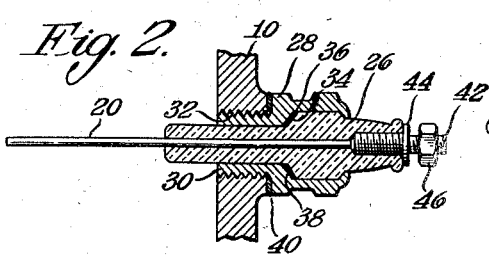

In the accompanying drawing:

Figure 1 is a diagrammatic illustration of the electric circuit illustrating, structurally, the manner in which the circuit electrodes are supported for coaction with the water; and Figure 2 is a sectional detail view of one of the electrodes.

In the embodiment selected to illustrate my invention, I make use of a tubular member 10 arranged vertically and provided with flanges 12 at its ends for connection with flanges 14 on the ends of pipes 16 and 18 which have communication with the steam boiler (not shown). The body 10 is located on the steam boiler in a position equivalent to the location of the water glass, so that normal water levels which would appear in such a glass would also rise to positions inside the member 10.

Three electrodes 20, 22 and 24 extend horizontally inside the member 10. Fig. 2 illustrates the specific construction of the electrode 20 and, since all the electrodes are similar in construction and operation, the description of one will apply to all. The sleeve 26, inside which the electrode 20 is secured, is partially enclosed inside a shell 28 having a threaded shank 30 threaded into the opening 32 in the member 10. Sleeve 26 preferably comprises glazed porcelain and is provided with a shoulder 34 against which is seated a sealing element 36 lying against a shoulder 38 in the shell 28. A sealing element 40 is interposed between the shell 28 and the member 20 so as to provide a liquid and pressure tight connection between the electrode structure and the member 10. The exterior end 42 of the electrode includes a flange 44 and a nut 46 threaded on the end 42 so that a lead may be clamped between the flange and the nut.

In Fig. 1, the electric circuit includes three control circuits 48, 50 and 52 respectively associated with the electrodes 20, 22 and 24. Three operating circuits 54, 56 and 58 are respectively associated with the control circuits 48, 50 and 52. The current supply lines 60 and 62 are connected with the primary winding 54 of a transformer 66, and the secondary windings 68, 70 and 72 are respectively connected with the electrodes 20, 22 and 24 through the medium of leads 74, 76 and 78. Leads 80, 82 and 84 respectively connect the secondary windings 68, 70 and 72 with relays 86, 88 and 90 respectively included in the control circuits 48, 50 and 52.

In the control circuit 48 is a vacuum tube 92 having its filament 94 connected with the secondary winding 68 by a lead 96, which lead is grounded at 98. A lead 100 connects the filament 94 with the lead 74, and a lead 102 connects the grid 104 with the lead 74, the latter having a condenser 106 interposed therein between its connection with the leads 100 and 102.

The plate 108 of the vacuum tube 92 is connected with a lead 110 connected with the relay 86, and a condenser 112 is connected across the leads 80 and 110, with the screen grid 114 connected with the lead 80 through the medium of a lead 116. The control circuits 50 and 52 are also each provided with a vacuum tube 92, all of which tubes are identical and well known in the art. Since the circuits 48, 50 and 52 are identical in all respects, the reference numerals applied to the tube 92 and its wiring in the circuit 48 are similarly applied in the circuits 50 and 52.

The armature 118 associated with the relay 86 is connected with a lead 120 and is normally spaced from a contact 122 connected with a lead 124. Lead 120 connects with a relay 126 having its second lead 128 connected with a secondary winding 130 of the transformer 66. A lead 132 connects the secondary winding 130 with the lead 124, and a lead 136 connects the lead 132 with the armature 138 of the relay 126. Armature 138 is normally spaced from a contact 140 connected with a solenoid coil 142 which, when energized, serves to open a water supply valve 144, which valve is normally closed. Solenoid coil 142 is connected with the secondary winding 130 by a lead 146.

A lead 148 connects the armature 150 of the relay 88 with an alarm relay 152 having its second lead 154 connected with a lead 156 connected with the secondary winding 130. A lead 158 connects the lead 132 with the armature 160 of the alarm relay 152, which armature is normally spaced from a contact 162 connected with an alarm 164 having its second wire 166 connected with the wire 156.

A lead 168 connects the armature 170 of the relay 90 with a fuel cut-off relay 172 to the armature 174 of which is connected the wire 132. Armature 174 is normally spaced from a contact 176 connected with a solenoid coil 178 which, when energized, serves to close a fuel cut-off valve 180. The solenoid coil 178 has its second wire 182 connected with the wire 156, the latter serving as the second wire for the relay 172. The contacts 184 and 186 of the relays 88 and 90, respectively, are connected with the wire 124.

The valves 144 and 180, together with the alarm 164, which may be of the audible or visible type are well known in the art and need not be explained in detail. Suffice it to say that the valve 144 is normally closed and opens only when the water in the boiler reaches a predetermined low level. Also, the fuel cut-off valve 180 is closed only when the water in the boiler reaches a predetermined third or dangerous low level. Member 10 is grounded at 188.

The leads 74, 76 and 78 are respectively connected with the grid circuits of the vacuum tubes 92. Fig. 1 illustrates the liquid level at 199, at which time the electrodes 22 and 24 are submerged in the liquid while the electrode 20 is partially submerged. So long as the electrode 20 makes contact with the water or other conducting fluid in the member 10, the grid circuit of the vacuum tube 92 in the control circuit 48 is effectively shorted to cathode, removing the bias and causing the tube to draw sufficient current to close the relay in its plate circuit so that the armature 118 will normally take the position of Fig. 1. If, however, the water level in the member 10 descends until the electrical circuit of the electrode 20, the water and the metallic body is broken, then the grid of the vacuum tube 92 is open, or floating, and no current will flow in the plate circuit. The relay 86 then releases the armature 118 for engagement with the contact 122. When such contact is established the circuit will be closed through the relay 126, which moves the armature 138 into engagement with the contact 140 for energizing the solenoid coil 142 for opening the water supply valve 144.

With the water supply valve 144 open, water will rise in the boiler until it again makes contact with the electrode 20, which again causes energization of the relay 86 to move its armature 118 out of engagement with the contact 122 so as to break the circuit through the relay 126 and deenergize the solenoid coil 142 so that the water supply valve 144 may close.

As long as the circuit relating to the water supply valve 144 operates in a normal manner, the level of the water in the boiler will be automatically maintained. In the event of failure of any part of this phase of the system, the water level in the boiler drops below the electrode 22. Such low level of the water will cause deenergization of the relay 88 so that its armature 150 will engage the contact 184 for closing the circuit through the relay 152. With the relay 152 energized, the armature 116 is pulled into engagement with the contact 162 so as to close the circuit through the signal 164. Thus the attendant is warned that the water in the boiler has dropped below the safe level normally maintained by the control circuit 48. If the boiler is then attended, and the water replaced to the required level, the system will be restored to normal, but if the water is not replaced and the system not repaired, continued lowering of the water level in the boiler finally brings the level below the electrode 24. Under such conditions, the relay 90 will be deenergized to release the armature 170 for engagement with the contact 186, which closes the circuit through the relay 172. Energization of the relay 172 moves the armature 174 into engagement with the contact 176 to close the circuit through the solenoid coil 178, so that the fuel cut-off valve 180 will be actuated to cut off the supply of fuel to the boiler. Thus the fire will be extinguished and the boiler protected from damage. It is preferred that the fuel cut-off valve 180 be of the locking type, so that when once the valve has been closed because of a low water condition in the boiler, it will not reopen electrically but must be opened manually by the attendant after the water level has been restored in the boiler.

The system is extremely sensitive in its operation. A change in the water level as small as one-sixteenth of an inch will bring the control circuit 48 into action for opening the supply valve 144. The glazed porcelain sleeves of the electrodes prevent corrosion and effectively insulate the electrodes from the body of the member 10. The electrodes 20, 22 and 24 are positioned horizontally. When the water level in the boiler reaches the level of the electrode, the circuit which that electrode controls will be immediately made, or when the water descends below that level, the circuit will be instantly broken, thus allowing a relatively small differential in the water level between the times that the circuit is made and broken. The porcelain sleeves associated with the electrodes are capable of withstanding extreme temperatures and pressure conditions without damage or deterioration over long periods of time.

Without further elaboration, the foregoing will so fully illustrate my invention that others may, by applying current knowledge, readily adapt the same for use under various conditions of service.

I claim:

1. In a steam boiler: an electrode located for contact with the water in the boiler at its normal level therein; said boiler being grounded; an electrically operated water supply valve and an operating circuit therefor; a vacuum tube connected with a source of current and having its grid circuit connected with said electrode to energize the plate circuit of the vacuum tube through contact between said electrode and the water in the boiler; said vacuum tube having a grounded filament; a relay connected into said plate circuit; and a switch connected into said operating circuit and biased to an open position by the energized relay, but moving to a closed position upon deenergization of the plate circuit and the relay when the water in the boiler moves out of contact with said electrode, to open said water supply valve.

2. The invention described in claim 1 wherein said electrode is positioned horizontally.

JACK L. PINKERTON.